United States Patent
Lu et al.

(10) Patent No.: US 9,723,152 B2
(45) Date of Patent: *Aug. 1, 2017

(54) NONLINEAR ECHO SUPPRESSION (71) Applicant: Conexant Systems, LLC, Irvine, CA (US)

(72) Inventors: Youhong Lu, Irvine, CA (US); Trausti Thormundsson, Irvine, CA (US)

(73) Assignee: Conexant Systems, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,799

(22) Filed: Jun. 1, 2015

(65) Prior Publication Data

US 2015/0341501 A1    Nov. 26, 2015

Related U.S. Application Data

(63) Continuation of application No. 13/431,662, filed on Mar. 27, 2012, now Pat. No. 9,049,281.

(Continued)

(51) Int. Cl.
*H04B 3/20* (2006.01)
*H04M 9/08* (2006.01)
(Continued)

(52) U.S. Cl.
CPC ............. *H04M 9/082* (2013.01); *G10K 11/16* (2013.01); *H04B 3/23* (2013.01); *G10K 2210/505* (2013.01)

(58) Field of Classification Search
CPC .......... H04B 3/23; H04B 3/237; H04B 7/015; H04M 9/082; H04M 9/085; G10K 11/16; G10K 2210/505

(Continued)

(56) References Cited

FOREIGN PATENT DOCUMENTS

EP    1 978 649    10/2008
WO    WO 03/010950    2/2003

OTHER PUBLICATIONS

Diego A Bendersky et al. "Nonlinear residual acoustic echo suppression for high levels of harmonic distortion", Acoustics, speech and Signal Processing, 2008, ICASSP 2008, IEE International Conference on IEEE Piscataway, NJ, USA, Mar. 31, 2008.*

(Continued)

*Primary Examiner* — Vivian Chin
*Assistant Examiner* — Ammar Hamid
(74) *Attorney, Agent, or Firm* — Haynes and Boone, LLP (57) ABSTRACT

Presented is a method and associated system for suppression of linear and nonlinear echo. The method includes dividing an input signal into several frequency bands in each of a several of time frames. The input signal may include an echo signal. The method further includes multiplying the input signal in each of the several frequency bands by a corresponding echo suppression signal. Calculating the corresponding echo suppression signal may include estimating a power of the echo signal in a particular frequency band as a sum of several component echo powers, each of the several component echo powers due to an excitation from a far-end signal in a corresponding one of the several frequency bands. Calculating the corresponding echo suppression signal may further include subtracting the power of the echo signal in the particular frequency band from a power of the input signal in the particular frequency band.

9 Claims, 5 Drawing Sheets

Related U.S. Application Data

(60) Provisional application No. 61/516,088, filed on Mar. 28, 2011.

(51) Int. Cl.
*G10K 11/16* (2006.01)
*H04B 3/23* (2006.01)
*H04R 29/00* (2006.01)

(58) Field of Classification Search
USPC .............. 381/66; 370/289, 286; 379/406.01, 379/406.05; 700/94
See application file for complete search history.

(56) References Cited

OTHER PUBLICATIONS

Bendersky et al., "Nonlinear Residual Acoustic Echo Suppression for High Levels of Harmonic Distortion", ICASSP, 2008, pp. 261-264, IEEE.

\* cited by examiner

NONLINEAR ECHO SUPPRESSION

CROSS-REFERENCE TO RELATED APPLICATIONS

This application is a continuation of U.S. patent application Ser. No. 13/431,662 filed on Mar. 27, 2012, which claims priority to U.S. Provisional Patent Application No. 61/516,088 filed on Mar. 28, 2011, which are hereby incorporated by reference in their entirety.

BACKGROUND

Echo cancellation is a requirement in many applications such as speakerphones, entertainment theater systems, and audio digital signal processing. However, current echo cancellation methods either cancel only linear echo, or are very computation-intensive in order to provide acceptable nonlinear echo modeling accuracy. For example, most echo cancellation systems in the frequency domain comprise two components: linear adaptive echo cancellation (LAEC) and nonlinear suppression of residual echo (NLP). Current methods of nonlinear echo suppression attempt to remove residual echo after LAEC application, utilizing echo return loss (ERL) and/or echo return loss enhancement (ERLE). Where ERL or ERL and ERLE are above a certain threshold NLP attempts to remove the residual echo and insert comfort noise. Such methods may be useful where the linear echo canceller adequately removes linear echo and nonlinear echo is small. However, such methods may unacceptably clip or distort soft voices spoken by local speakers.

In addition, current nonlinear echo cancellation techniques based on Volterra filters, for example, require many taps to achieve accurate modeling of the nonlinear echo. Consequently, accepted adaptive filtering algorithms for echo cancellation have high computation costs and tend to converge very slowly. Moreover, current nonlinear echo cancellation techniques are based on the correlation between echo and residual echo or between far-end and near-end signals in the same frequency band. As a result, current echo suppression techniques essentially suppress the linear echo component in a particular frequency band. Accordingly, such techniques may be used to suppress nonlinear echo via overestimation of the linear echo only if the nonlinear echo is very small. However, in general, these current methods cannot accurately suppress the nonlinear echo.

SUMMARY OF THE INVENTION

The present disclosure is directed to nonlinear echo suppression, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1A:
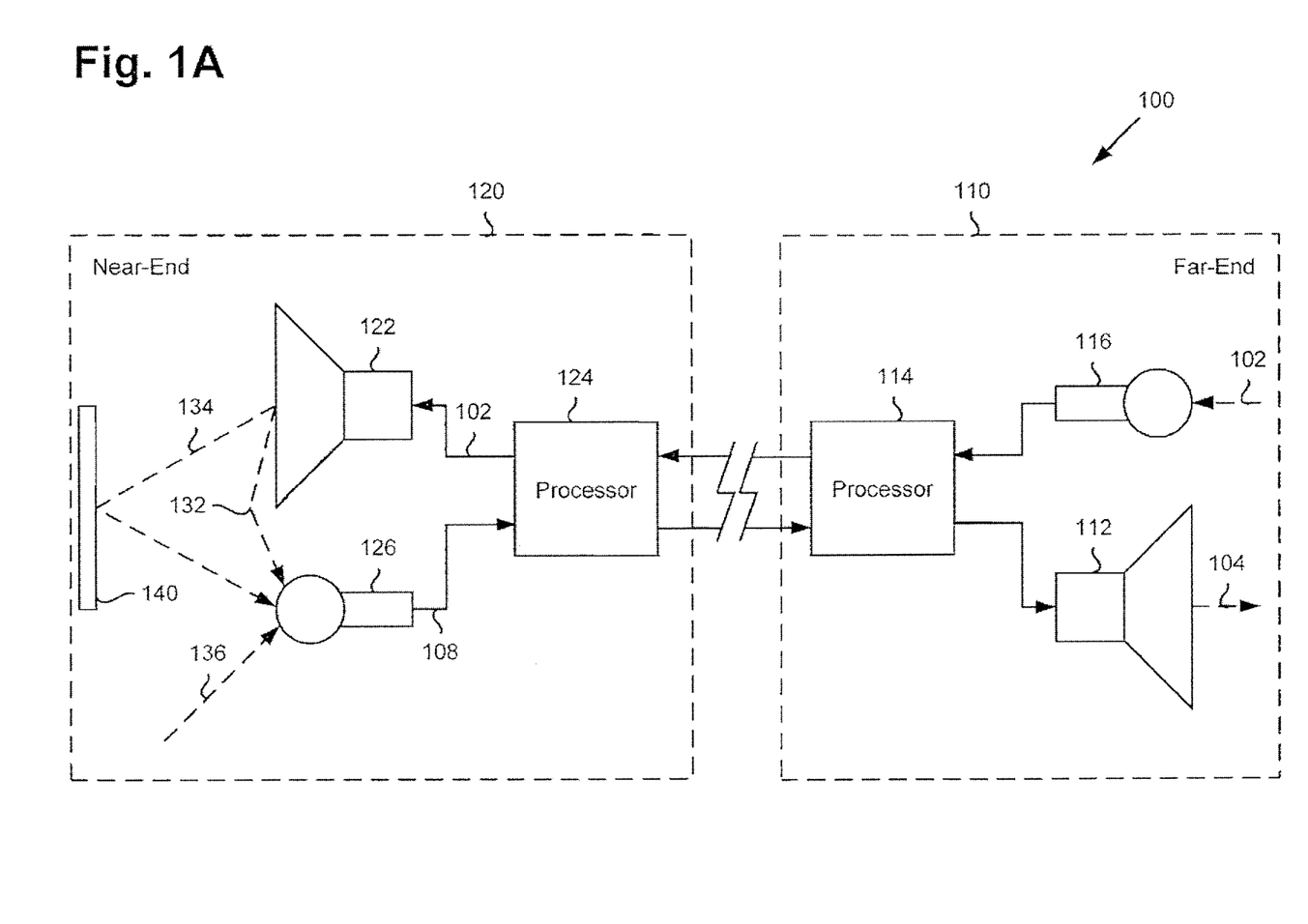
FIG. 1A presents an exemplary system for echo suppression, according to one implementation of the present application.

FIG. 1A presents an exemplary system for echo cancellation, according to one implementation of the present application. As shown in FIG. 1A, system 100 may include far end 110 and near end 120. Far end 110 may include microphone 116 for detecting far end signal 102, which may be speech or any other audio that is to be transferred from far end 110 to a listener at near end 120, for example. Far end 110 may also include speaker 112 for broadcasting an echo-suppressed signal from near end 120, for example. Far end 110 may also include processor 114, which may be similar to processor 124 of near end 120, and may be configured to perform any number of processing actions as required by one or more implementations of the present application.

Far end signal 102 may be routed from far end 110 to near end 120 by any appropriate means and input to processor 124, for example. Near end 120 may further include speaker 122 for broadcasting far end signal 102 at near end 120. Near end 120 may also include microphone 126 for receiving input signal 108. Input signal 108 may include a desired signal 136 as well as an echo signal. Such an echo signal may include direct-coupled signal 132 and reflected signal 134, for example. Direct-coupled signal 132 may result from microphone 126 picking up far end signal 102 broadcasted directly from loudspeaker 122. Depending on the characteristics of environment 140 of near end 120, reflected signal 134 may include linear as well as nonlinear echo of far end signal 102. For the purpose of the present application, echo is considered nonlinear if the echo produced by a particular signal contains harmonics of the particular signal in addition to echo at the frequency of the particular signal.

Figure 1B:
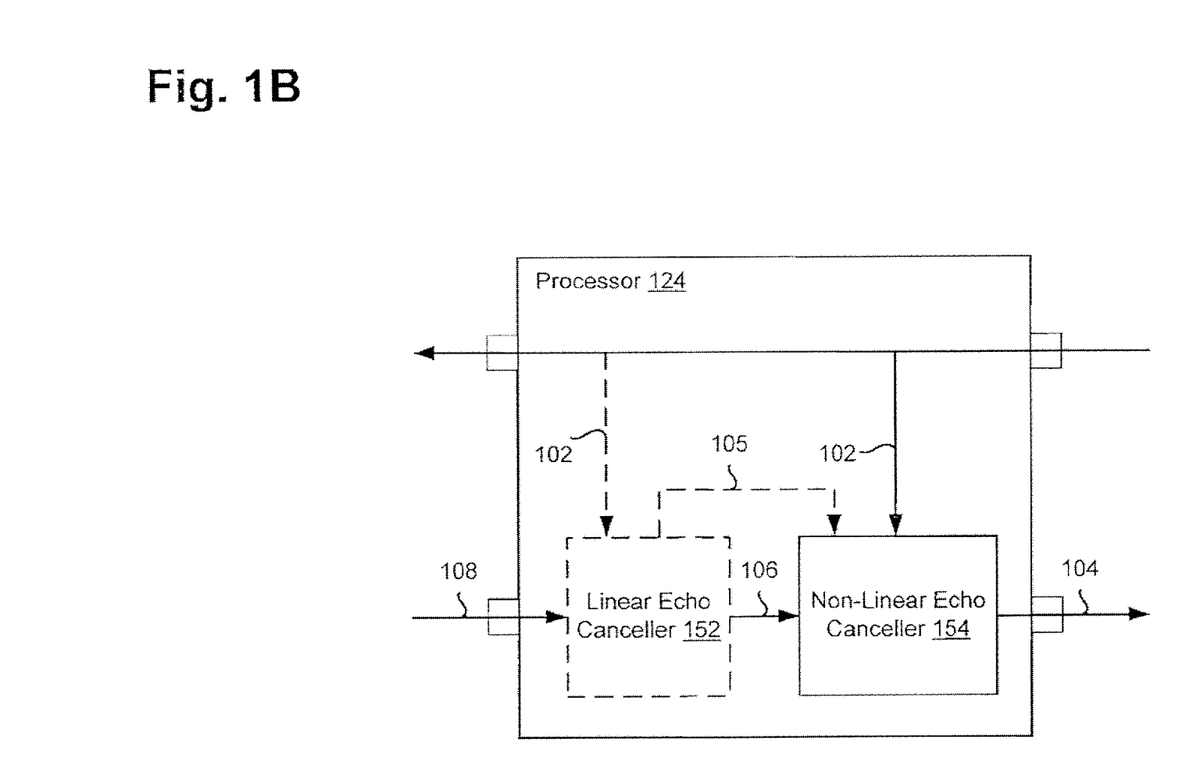
FIG. 1B presents an exemplary diagram of a processor within a system for echo suppression, according to one implementation of the present application.

FIG. 1B presents an exemplary diagram of processor 124 within system 100 for echo suppression, according to one implementation of the present application. FIG. 1B presents processor 124 as in FIG. 1A, including nonlinear echo canceller 154, which may be configured to perform nonlinear echo cancellation according to one or more implementations of the present application. Processor 124 may also optionally include linear echo canceller 152 connected to nonlinear echo canceller 154. In implementations including linear echo canceller 152, input signal 108 and far end signal 102 may be received by linear echo canceller 152. Linear echo canceller 152 may be configured to generate a synthesized echo 105, which may be an estimation of the linear echo at near end 120 of FIG. 1A, based on input signal 108 and far end signal 102. Thus, in implementations including linear echo canceller 152 residual signal 106 may be equivalent to input signal 108 minus synthesized echo 105. As will be discussed in further detail below, one implementation may include nonlinear echo canceller 154 utilizing synthesized echo 105 and far end signal 102 to suppress nonlinear echo. Where linear echo canceller is not utilized, input signal 108 may be input directly to nonlinear echo canceller 154.

Looking back to FIG. 1A, assuming that far end signal 102 output from speaker 122 is a tonal signal, we can expect to see harmonics of the tonal signal in the input signal from microphone 126. Mathematically, the nonlinear operation to such a tonal signal results in a linear combination of the tone and its harmonics. Thus, if a single frequency is played from speaker 122, the input signal from microphone 126 may include signals in all other frequency bands. The stronger the nonlinearity of the environment at near end 120, the stronger will be the harmonics of the tonal signal. However, because typical loudspeakers only exhibit a small number of stronger harmonics, taking into account only the stronger harmonics may save considerable computational cost in a nonlinear echo suppressor.

Looking at nonlinear echo behavior from another viewpoint, input signal 108 from microphone 126 in a particular frequency band includes delayed and distorted far end signal 102 in the same frequency band due to linear coupling signal 132 as well as reflected signal 134. As stated above, input signal 108 will also contain harmonics of the particular frequency due to nonlinear echo in coupling signal 132 and in reflected signal 134, caused by near end environment 140. Thus, echo in a particular frequency band has a number of components corresponding to the number of frequency bands in far end signal 102, for example. Accordingly, echo in a particular frequency band may consist of M components, where M is the number of frequency bands. Because each of the M components is nonlinear echo, each component is uncorrelated to each of the other components.

Let M, an integer, be the number of frequency bands used in frequency-band decomposition for nonlinear echo suppression. $x(n,m)$ may denote far end signal 102 at band m and during time frame n, which may be broadcast out of near end speaker 122. $y(n,m)$ may denote the echo signal due to direct-coupled signal 132 and reflected signal 134. $d(n,m)$ may denote desired near end signal 136, which may include background noise and other local sounds that are not echo. Thus, input signal 108, $z(n,m)$, received by microphone 126 may be denoted by:

$$z(n,m)=y(n,m)+d(n,m) \text{ where } 0 \leq n < M \text{ and } n \text{ is the frame index}$$

As stated above, the total echo in each frequency band m includes M echo components, specifically, one component due to the excitation caused by far end signal 102 in each of the M frequency bands. Thus, the sum of each of these components is the total echo, $y(n,m)$. Mathematically, this relation may be denoted as:

$$y(n,m) = \sum_{u=0}^{M-1} y_m(n,u)$$

where $y(n,m)$ is the total echo in frequency band m, and $y_m(n,u)$ is a component of the echo in frequency band m, due to the excitation caused by far end signal 102 in frequency band u.

Nonlinear echo suppression according to the present application may be accomplished utilizing a spectrum subtraction technique according to:

$$\hat{d}(n,m)=g(n,m)z(n,m)$$

where $\hat{d}(n,m)$ is an echo suppressed output signal 104 to be broadcast from speaker 112, for example, $g(n,m)$ is a weighting coefficient, and $z(n,m)$ is the input signal 108, for example.

According to a first implementation, weighting coefficient $g(n,m)$, for a frequency band m during timeframe n, may be computed according to:

$$g(n,m) = \left[ \frac{E\{|z(n,m)|^2\} - \sum_{u=0}^{m} E\{|y_m(n,u)|^2\}}{E\{|z(n,m)|^2\}} \right]^{\delta}$$

where $0 < \delta < 1$, $E\{|z(n,m)|^2\}$ is the power of input signal 108 in frequency band m, and $E\{|y_m(n,u)|^2\}$ is the component echo power in frequency band m due to the excitation caused by far end signal 102 in only band u. As shown in the above formula for $g(n,m)$, the component echo power in frequency band m due to the excitation caused by far end signal 102 in each frequency band from 0 to m is subtracted from the power of input signal 108 in frequency band m.

Because the component echo power in frequency band m is not directly known, estimation must be done in terms of some quantity or variable which is known or measurable. Thus, in the present implementation, the component echo power in frequency band m due to the excitation caused by far end signal 102 in each band u may be estimated according to:

$$E\{|y_m(n,u)|^2\}=k_m(n,u)E\{|x(n-D(m,u),u)|^2\}$$

where $k_m(n,u)$ is a weighting coefficient and $E\{|x(n-D(m,u),u)|^2\}$ is the power of far end signal 102 in frequency band u, but delayed by $D(m,u)$ timeframes. The delay is necessary because, as stated above, any nonlinear echo is a distorted, time-delayed version of far end signal 102. The weighting coefficient is necessary because the power of the echo component in frequency band u is attenuated compared to the exciting far end signal 102 in frequency band u.

Delay $D(m,u)$ is the echo delay of far end signal 102 in frequency band u which is exciting an echo in frequency band m. Thus, determining the magnitude of the delay may be estimated by determining the delay for which the normalized cross-correlation is maximized between the power of input signal 108 in frequency band m and the power of far end signal 102 in frequency band u. For the purposes of the present application, cross-correlation may be considered to mean the mathematical correlation between two signals or functions where one of the signals is shifted with respect to the other. Thus, $D(m,u)$ may be determined such that:

$$\left| \frac{E\{z*(n,m)x(n-d,u)\}}{E\{|x(n-d,u)|^2\}} \right|$$

is maximized at $d=D(m,u)$

Similarly, weighting coefficient $k_m(n,u)$ may be estimated as the normalized cross-correlation between the power of input signal 108 in frequency band m and the power of far end signal 102 in frequency band m:

$$k_m(n, u) = \left| \frac{E\{z*(n, m)x(n - D(m, u), m)\}}{E\{|x(n - D(m, u), m)|^2\}} \right|$$

The above technique, according to a first implementation, may be used where a linear echo canceller is not employed. However, the above technique may also be adapted to applications where a linear echo canceller is employed. In a second implementation, input signal 108, corresponding to z(n,m) may be replaced by residual signal 106, corresponding to e(n,m). Such a replacement may be made because, where a linear echo canceller is used, residual signal 106 may comprise the original input signal 108 minus synthesized echo 105 cancelled by linear echo canceller 152, for example:

$$e(n,m) = z(n,m) - \hat{y}(n,m)$$

where e(n,m) corresponds to residual signal 106, z(n,m) corresponds to input signal 108 and y(n,m) corresponds to synthesized echo 105 cancelled by linear echo canceller 152, for example. Thus, for the second implementation where a linear echo canceller is used:

$$g(n, m) = \left[ \frac{E\{|e(n, m)|^2\} - \sum_{u=0}^{m} E\{|y_m(n, u)|^2\}}{E\{|e(n, m)|^2\}} \right]^\delta$$

where $0 < \delta < 1$, $E\{|e(n,m)|^2\}$ is the power of residual signal 106 in frequency band m, and $E\{|y_m(n,u)|^2\}$ is the component echo power in frequency band m due to the excitation caused by far end signal 102 in only band u. The component echo power in frequency band m due to the excitation caused by far end signal 102 in each band u may be estimated as in the first implementation:

$$E\{|y_m(n,u)|^2\} = k_m(n,u)E\{|x(n-D(m,u),u)|^2\}$$

Echo delay D(m,u) of far end signal 102 in frequency band u, exciting an echo in frequency band m may be similarly estimated such that the normalized cross-correlation is maximized between the power of residual signal 106 in frequency band m and the power of delayed far end signal 102 in frequency band u:
where $$\left| \frac{E\{e*(n, m)x(n - d, u)\}}{E\{|x(n - d, u)|^2\}} \right|$$

is maximized at d=D(m,u)

Weighting coefficient $k_m(n,u)$ may be estimated as the normalized cross-correlation between the power of residual signal 106 in frequency band m and the power of far end signal 102 in frequency band m:

$$k_m(n, u) = \left| \frac{E\{e*(n, m)x(n - D(m, u), m)\}}{E\{|x(n - D(m, u), m)|^2\}} \right|$$

A third implementation teaches a second technique for nonlinear echo suppression, based on the synthesized echo estimated by a linear echo canceller. According to the third implementation, weighting coefficient g(n,m), for a frequency band m during timeframe n, may be computed precisely as in the second implementation above:

$$g(n, m) = \left[ \frac{E\{|e(n, m)|^2\} - \sum_{u=0}^{m} E\{|y_m(n, u)|^2\}}{E\{|e(n, m)|^2\}} \right]^\delta$$

As stated above, in the third implementation, the component echo power in frequency band m due to the excitation caused by far end signal 102 in each band u may be estimated based on synthesized echo 105 estimated by linear echo canceller 152, for example, according to:

$$E\{|y_m(n,u)|^2\} = k_m(n,u)E\{|\hat{y}(n,u)|^2\}$$

where $k_m(n,u)$ is the weighting coefficient and $E\{|\hat{y}(n,m)|^2\}$ is the power of synthesized echo 105 in frequency band nm, estimated by linear echo canceller 152, for example. In the third implementation no delay in $\hat{y}(n,m)$ is necessary because the estimation of sythnesized echo 105 may already in clued adjustment for delay in the linear echo.

Weighting coefficient $k_m(n,u)$ may be estimated as the normalized cross-correlation between the power of residual signal 106 in frequency band m and the power of synthesized echo 105 in frequency band u:

$$k_m(n, u) = \left| \frac{E\{e*(n, m)\hat{y}(n, u)\}}{E\{|\hat{y}(n, u)|^2\}} \right|$$

The operation of system 100 of FIG. 1A will now be further discussed with regard to FIGS. 2A-2F. FIGS. 2A-2F present exemplary diagrams of several related signals present within a system for echo suppression, according to one implementation of the present application. For example, FIG. 2A may illustrate a far end signal, such as far end signal 102, comprising several components, each in one of M frequency bands. By way of non-limiting illustration, M=4 in FIGS. 2A through 2F. However, the present application is not limited such a number of frequency bands and may include implementations containing more or less than 4 frequency bands. Thus, components 210a, 210b, 210c and 210d may correspond to components of far end signal 102, or x(n,u), in frequency bands $f_0$, $f_1$, $f_2$ and $f_{M-1}$, respectively.

FIG. 28 demonstrates the echo components in each of the M frequency bands due to only the excitation caused by far end signal 102 in frequency band $u=f_0$, or 210a. Thus, the excitation produced by far end signal component 210a may produce echo components 220a, 220b, 220c and 220d in frequency bands $f_0$, $f_1$, $f_2$ and $f_{M-1}$, respectively. Similarly, FIG. 2C demonstrates the echo components in each of the M frequency bands due to only the excitation caused by far end signal 102 in frequency band $u=f_1$, or 210b. Thus, the excitation produced by far end signal component 210b may produce echo components 230a, 230b, 230c and 230d in frequency bands $f_0$, $f_1$, $f_2$ and $f_{M-1}$, respectively. Likewise, FIG. 2D demonstrates the echo components in each of the M frequency bands due to only the excitation caused by far end signal 102 in frequency band $u=f_2$, or 210c. Thus, the excitation produced by far end signal component 210c may produce echo components 240a, 240b, 240c and 240d in frequency bands $f_0$, $f_1$, $f_2$ and $f_{M-1}$, respectively. Finally, FIG. 2E demonstrates the echo components in each of the M frequency bands due to only the excitation caused by far end signal 102 in frequency band $u=f_{M-1}$, or 210d. Thus, the excitation produced by far end signal component 210d may produce echo components 250a, 250b, 250c and 250d in frequency bands $f_0$, $f_1$, $f_2$ and $f_{M-1}$, respectively.

Figure 2A:
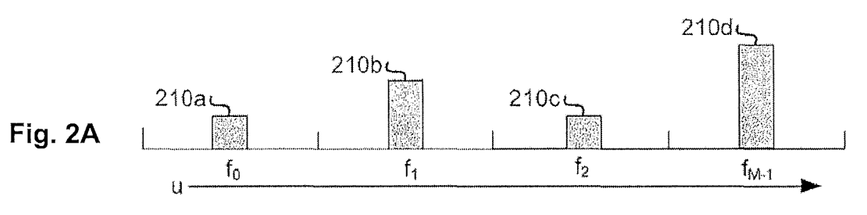
FIGS. 2A-2F present exemplary diagrams of several related signals present within a system for echo suppression, according to one implementation of the present application.
Figure 2B:
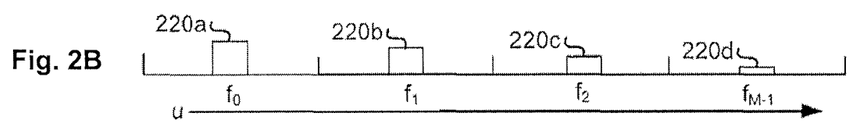
Figure 2C:
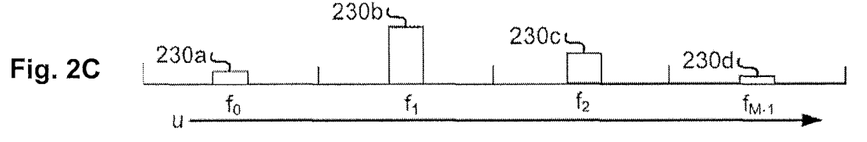
Figure 2D:
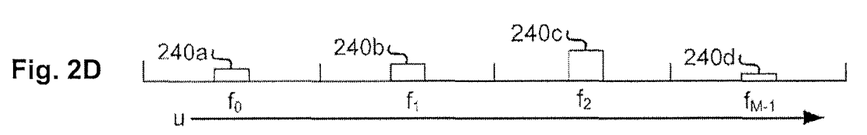
Figure 2E:
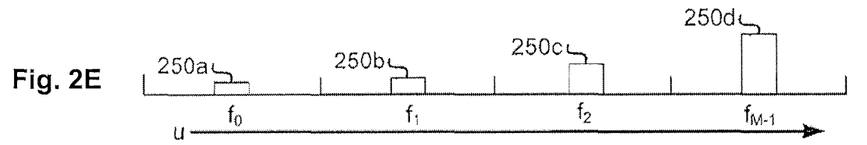
Figure 2F:
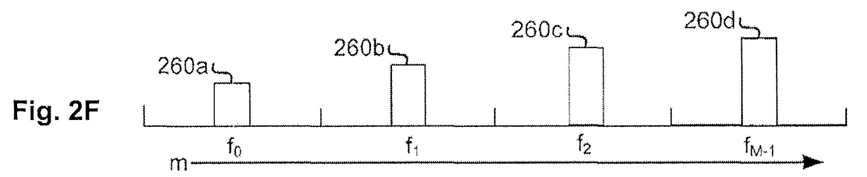

Thus, in accordance with one or more implementations of the present application, the total echo in each frequency band m includes M echo components, one component due to the excitation caused by a far end signal in each of the M frequency bands. FIG. 2F shows such a total echo in each frequency band. For example, 260a may represent the total echo in frequency band $f_0$ as the sum of each of the $f_0$ component echoes 220a, 230a, 240a and 250a. Likewise, 260b may represent the total echo in frequency band $f_1$ as the sum of each of the $f_1$ component echoes 220b, 230b, 240b and 250b, 260c may represent the total echo in frequency band $f_2$ as the sum of 220a, 230a, 240a and 250a, while 260d may represent the total echo in frequency band $f_{M-1}$ as the sum of each of the $f_{M-1}$ component echoes 220d, 230d, 240d and 250d.

Figure 3A:
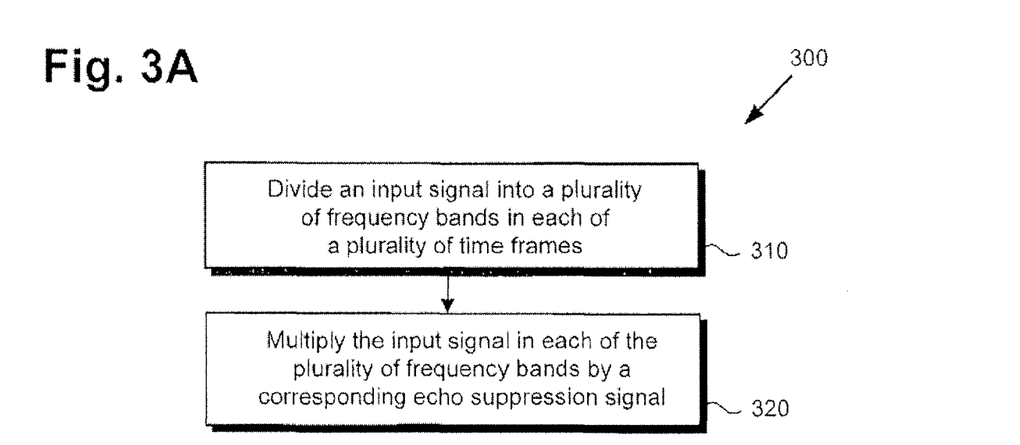
FIG. 3A presents an exemplary flowchart illustrating a method for echo suppression, according to one implementation of the present application.
Figure 3B:
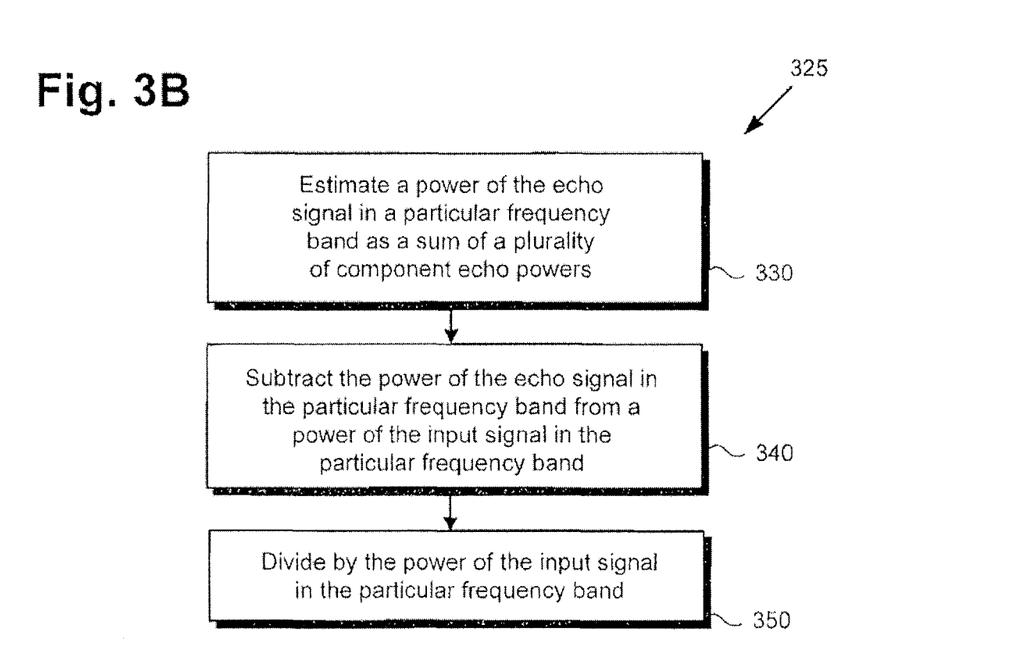
FIG. 3B presents an exemplary flowchart illustrating a method for estimating a corresponding echo suppression signal, according to one implementation of the present application.
Figure 3C:
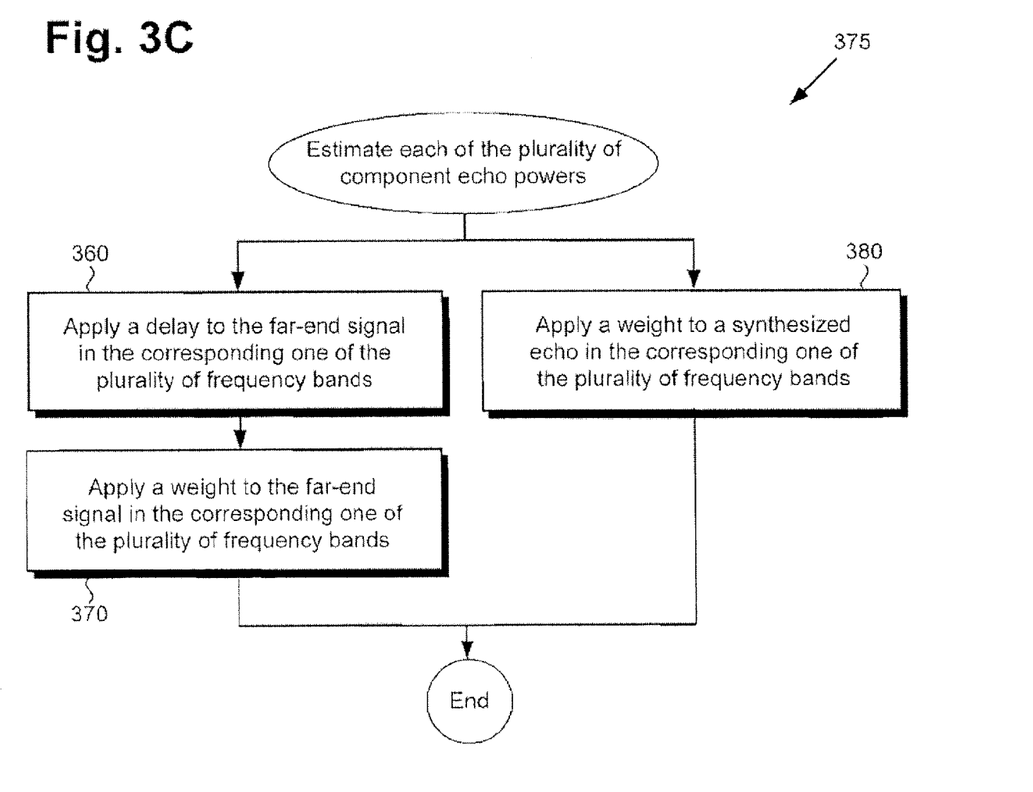
FIG. 3C presents an exemplary flowchart illustrating one or more methods for estimating each of a plurality of component echo powers, according to one implementation of the present application.

The operation of system 100 of FIG. 1 will now be further described with respect to FIGS. 3A through 3C. FIG. 3A presents an exemplary flowchart illustrating a method for echo suppression, according to one implementation of the present application. Action 310 of flowchart 300 includes dividing an input signal into a plurality of frequency bands in each of a plurality of timeframes. Such an action may be carried out by processor 124 of FIG. 1A, for example.

Continuing to action 320 of flowchart 300, action 320 includes multiplying the input signal in each of the plurality of frequency bands by a corresponding echo suppression signal. Because action 310 divides an input signal into a plurality of frequency bands in each of a plurality of timeframes, an echo-suppressed signal may be obtained by decreasing the amplitude or power of each frequency band of the input signal, containing a desired signal and the echo signal, by an amount that correlates to the amplitude or power of the echo in that frequency band. Such an action may be carried out by processor 124 of FIG. 1A for example.

FIG. 3B presents an exemplary flowchart illustrating a method for estimating the corresponding echo suppression signal, according to one implementation of the present application. The actions disclosed in FIG. 3B may be considered a subset of action 320 of FIG. 3A. Action 330 of flowchart 325 includes estimating a power of the echo signal in a particular frequency band as a sum of a plurality of component echo powers. As disclosed above in FIGS. 2A through 2F echo in a particular frequency band may be a sum of contributing echo components in that particular frequency band excited by far end signal 102 in each of the M frequency bands. However, because many loudspeakers only exhibit a few stronger harmonics of a broadcast signal, computation costs may be reduced by utilizing only the stronger harmonics in estimating total echo power. For example, echo in band m is most likely due to excitations in bands $u \le m/k$ where k is an integer. Accordingly, the present method may consider only the $u=m$, m/2 and m/3 echo components in determining total echo for each frequency band m. How each of the component echo powers may be estimated will be discussed in further detail with respect to FIG. 3C.

Continuing with action 340 of flowchart 325, action 340 includes subtracting the power of the echo signal in the particular frequency band from a power of the input signal in the particular frequency band. Such an action may be carried out by processor 124 of FIG. 1A, for example.

Action 350 includes dividing by the power of the input signal in the particular frequency band. Dividing by the power of the whole input signal acts to represent the resulting signal, which may represent the input signal minus the echo, as a gain with which to multiply the input signal to achieve echo-suppressed signal 104, for example. Such an action may be carried out by processor 124 of FIG. 1A, for example.

FIG. 3C presents an exemplary flowchart illustrating one or more methods for estimating each of the plurality of component echo powers. The actions disclosed in FIG. 3C may be considered a subset of action 330 of FIG. 3B. Action 360 of flowchart 375 includes applying a delay to the far-end signal in the corresponding one of the plurality of frequency bands. As discussed above, each component echo in a particular frequency band is excited by far end signal 102, for example, in each of the M frequency bands. Because echoes are inherently delayed from their exciting signals, a delay must be applied to the far-end signal in order to estimate each of the plurality of component echo powers. As discussed above, the delay D(m,u) is chosen to maximize a cross-correlation between the input signal and the far end signal in the corresponding frequency band. Such an action may be carried out by processor 124 of FIG. 1A, for example.

Continuing with action 370 of flowchart 375, action 370 includes applying a weight to the far-end signal in the corresponding one of the plurality of frequency bands. As discussed above, the weight $k_m(n,u)$ may be a normalized cross-correlation between the input signal in the particular frequency band and the far end signal in the particular frequency band. Such an action may be carried out by processor 124 of FIG. 1A, for example.

Action 380 of flowchart 375 may be utilized to estimate each of the plurality of component echo powers when a linear echo canceller is utilized, for example, linear echo canceller 152 as shown in FIG. 1B. Action 380 includes applying a weight to a synthesized echo in the corresponding one of the plurality of frequency bands. Such a synthesized echo may represent an estimated linear echo as calculated by a linear echo canceller such as linear echo canceller 152 of FIG. 1B. Regarding action 380, the weight may be a normalized cross-correlation between the input signal in the m frequency band and the synthesized echo in the corresponding frequency band of the component echo power, or the u frequency band.

Thus, the present application provides for true nonlinear echo suppression. The concepts of the present application additionally provide for such echo suppression while markedly reducing associated computation costs and increasing the speed of convergence of such echo suppression computations.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for echo suppression, said system comprising:
a microphone configured to receive an input signal; and
a processor configured to:
divide the input signal into a plurality of frequency bands in each of a plurality of time frames, said input signal comprising an echo signal; and
multiply said input signal in each of said plurality of frequency bands by a corresponding echo suppression signal, wherein said processor is configured to calculate said corresponding echo suppression signal by:
estimating a power of said echo signal in a particular frequency band as a sum of a plurality of component echo powers, each of said plurality of component echo powers due to an excitation from a far-end signal in a corresponding one of said plurality of frequency bands;
subtracting said power of said echo signal in said particular frequency band from a power of said input signal in said particular frequency band;
wherein said processor is configured to estimate each of said plurality of component echo powers by:
applying a delay to said far-end signal in said corresponding one of said plurality of frequency bands; and
applying a weight to said far-end signal in said corresponding one of said plurality of frequency bands.

2. The system of claim 1, wherein said processor is further configured to calculate said corresponding echo suppression signal by dividing by said power of said input signal in said particular frequency band.

3. The system of claim 1, wherein said echo signal is a residual echo signal from a linear echo canceller.

4. The system of claim 1, wherein said plurality of component echo powers are uncorrelated with one another.

5. The system of claim 1, wherein said delay is chosen to maximize a cross-correlation between said input signal and said far-end signal in said corresponding one of said plurality of frequency bands.

6. The system of claim 1, wherein said weight is a normalized cross-correlation between said input signal in said particular frequency band and said far-end signal in said particular frequency band.

7. The system of claim 1, wherein said plurality of component echo powers comprise only component echo powers due to an excitation from said far-end signal in said corresponding one of said plurality of frequency bands, a frequency band having a frequency of one half of said corresponding one of said plurality of frequency bands, and a frequency band having a frequency of one third of said corresponding one of said plurality of frequency bands.

8. A system for echo suppression, said system comprising:
a microphone configured to receive an input signal; and
a processor comprising a linear echo canceller, said processor configured to:
divide said input signal into a plurality of frequency bands in each of a plurality of time frames; and
multiply said input signal in each of said plurality of frequency bands by a corresponding echo suppression signal, wherein said processor is configured to calculate said corresponding echo suppression signal by:
estimating a power of said echo signal in a particular frequency band as a sum of a plurality of component echo powers, each of said plurality of component echo powers due to an excitation from a far-end signal in a corresponding one of said plurality of frequency bands; and
subtracting said power of said echo signal in said particular frequency band from a power of said input signal in said particular frequency bands;
wherein said echo signal is a residual echo signal from said linear echo canceller, and
wherein said processor is configured to estimate each of said plurality of component echo powers by:
applying a weight to a synthesized echo in said corresponding one of said plurality of frequency bands, said synthesized echo obtained from said linear echo canceller.

9. The system of claim 8, wherein said weight is a normalized cross-correlation between said input signal in said particular frequency band and said synthesized echo in said corresponding one of said plurality of frequency bands.

* * * * *